United States Patent [19]

Carlton

[11] Patent Number: 4,883,171

[45] Date of Patent: Nov. 28, 1989

[54] ANIMAL CALL DEVICE HOLDER AND ASSEMBLY

[76] Inventor: Wayne Carlton, 206 Lynch St., Edgefield, S.C. 29824

[21] Appl. No.: 260,499

[22] Filed: Oct. 21, 1988

[51] Int. Cl.⁴ ............................................. B65D 85/00
[52] U.S. Cl. ................................ 206/315.11; 206/45; 206/44 B; 206/445
[58] Field of Search ............... 206/45, 44 B, 3, 315.1, 206/315.11, 425

[56] References Cited

U.S. PATENT DOCUMENTS

| | | | |
|---|---|---|---|
| 2,566,569 | 9/1951 | Jensen | 206/3 |
| 2,685,882 | 8/1954 | Martin | 206/44 B |
| 2,788,827 | 4/1957 | Banner | 206/45 |
| 4,589,544 | 5/1986 | Schweinsberg | 206/45 |
| 4,776,457 | 10/1988 | Ferraroni | 206/45 |

Primary Examiner—Joseph Man-Fu Moy
Attorney, Agent, or Firm—Donald E. Nist

[57] ABSTRACT

The animal call holder and at least one flat animal call device form the assembly. The holder includes a container having a bottom portion formed of a flat closed bottom, and integral upraised sides, rear and front sloped upwardly rearwardly and defining a lower storage space therewith. The bottom portion may have a pocket clip attached thereto and/or loops and a neck lanyard. The container also has an openable lid hinged to the bottom portion. The lid may be flat or may include a closed flat top and integral closed depending sides, front and rear sloped downwardly forwardly and adapted to rest on the upper edges of the bottom portion and which define an upper storage space. The top may be vapor permeable but water resistant in order to dry out wet animal call devices in the holder. The top inside may bear strips upon which indicia identifying the call devices can be marked. The container has a rhomboidal appearance in side elevation, with the top displaced rearwardly of the bottom, so that the holder is easy to slip into and remove from a pocket.

A rack is disposed in the bottom portion of the holder and includes a plurality of spaced parallel upwardly and rearwardly sloping plates connected to the bottom and/or sides of the bottom portion and defining pockets within which the lower portions of flat animal call devices are seated. The plates can have notched out upper central portions to facilitate gripping of the call devices.

13 Claims, 2 Drawing Sheets

ANIMAL CALL DEVICE HOLDER AND ASSEMBLY

BACKGROUND OF THE INVENTION

1. Field of the Invention

The present invention generally relates to storage means and more particularly to an improved holder for animal call devices.

2. Prior Art

Diaphragm-type animal call devices have been extensively used to call elk, wild turkeys, and in some cases even coyotes, geese, foxes and other game animals, so as to draw them towards the hunter and thus make for easier shooting thereof. Such call devices may be flat and generally disc-shaped with reeds of synthetic or natural rubber or plastic. The type of reed, the tightness of the reed, the positioning of the device in the mouth, and the amount of air pressure put on the reed determine the type of call which can be made.

The reeds of such devices are easily damaged and, when wet, the devices tend to stick together and are difficult to separate. Conventional cases for such devices usually comprise closed pouches in which the devices are merely stored in a heap, sometimes with damage thereto. Drying of the reeds is consequently slow in such pouches and retrieval of a preselected call device from the heap is difficult, especially when it is dark, raining or under other hunting conditions of poor visibility (fog, sleet, snow, high wind, etc.)

There remains a need for an improved animal call device holder which will hold the call devices apart from each other and in an organized fashion, which will safely protect them from damage, will permit them to be easily and rapidly identified and retrieved from the holder, and which will allow them to dry rapidly without sticking together. Such holder should also be easy to slip into and out of a pocket and be able to carry the call devices in a secure manner which will prevent them from rattling around. The holder preferably should also have a pocket clip and/or loops with an attached neck lanyard.

SUMMARY OF THE INVENTION

The improved animal call device holder and assembly of the present invention satisfies all the foregoing needs. The holder and assembly are substantially as set forth in the Abstract of the Disclosure.

Thus, the holder comprises a container having a bottom portion with a lower central storage space, and an openable lid hinged thereto. The lid may be flat or may comprise a flat top with downwardly forwardly sloped sides, rear and front to define an upper storage space. The lid top itself or the lid sides, rear and front rest on the lower portion. The top may be of vapor-permeable but water-resistant material and/or may include strips for marking indicia identifying animal call devices placed therein. The combination of such devices which are generally flat, disc-like and with reeds therein, and the holder comprises the present novel assembly. The container has a generally rhomboidal appearance in side elevation which facilitates its insertion into and withdrawal from a pocket. Thus, its front and rear ends are wedge-shaped. The bottom portion of the container may hold a pocket clip and/or loops and neck lanyard.

A rack is disposed in the bottom portion of the holder and comprises a plurality of transverse spaced parallel plates spanning the sides of the container and disposed from the front to the rear of said bottom portion, being sloped upwardly and rearwardly and connected to the container bottom and/or sides. The plates define animal call device-receiving pockets therebetween. The upper center of each plate may be notched out to provide a finger grip for easy removal of call devices from the holder.

The holder automatically organizes and separates the call devices for easy insertion into and removal from the holder. The devices are held in the holder pockets without rattling and without damage or sticking together. They dry sanitarily and rapidly and are instantly ready for use. They can be identified easily by feel (memorizing their position in the rack) as well as by sight, so the holder is useful in all types of weather, including the dark. The holder and assembly can be made inexpensively of durable materials.

Further features of the present invention are set forth in the following detailed description and accompanying drawings.

DRAWINGS

DETAILED DESCRIPTION FIGS. 1-5

Figure 1:
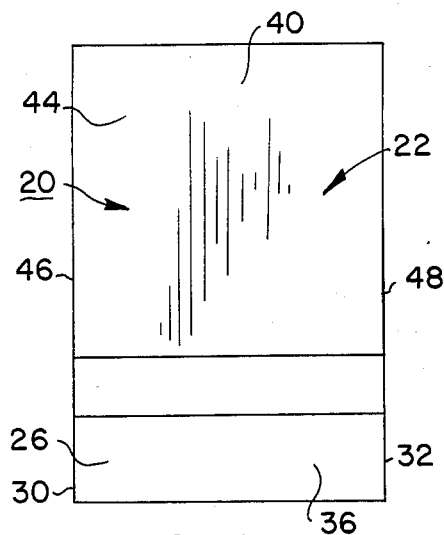
FIG. 1 is a schematic top plan view of a first preferred embodiment of the improved holder of the present invention with the lid thereof closed.
Figure 2:
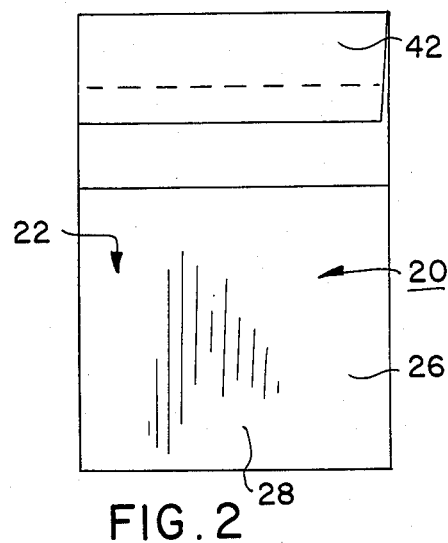
FIG. 2 is a schematic bottom plan view of the holder of FIG. 1.
Figure 3:
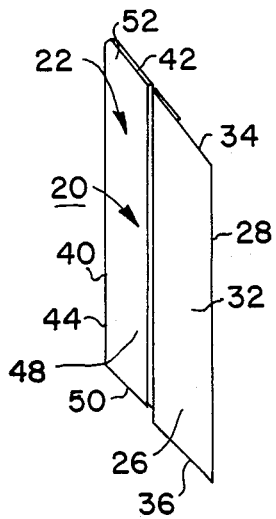
FIG. 3 is a schematic side elevation of the holder of FIG. 1.
Figure 4:
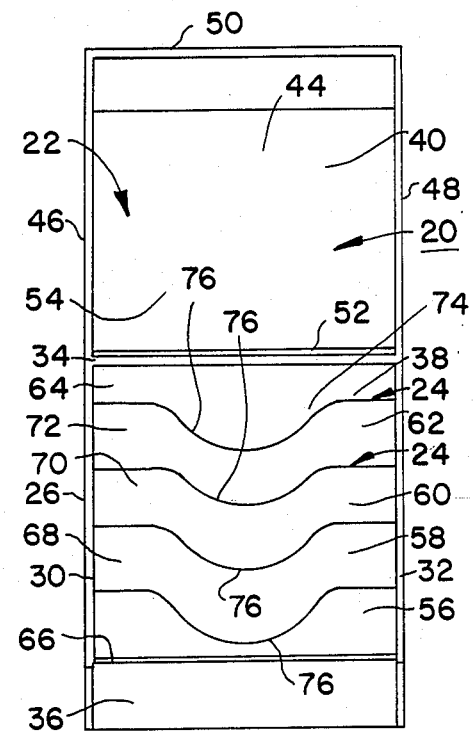
FIG. 4 is a schematic top plan view of the holder of FIG. 1 with the lid thereof fully open.
Figure 5:
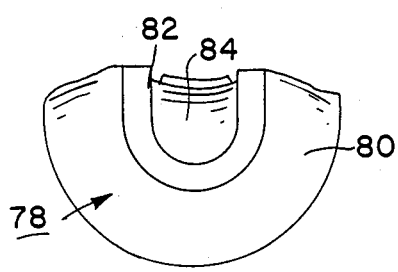
FIG. 5 is a schematic front elevation of a preferred embodiment of an animal call device storable in the holder of the present invention to form the assembly of the present invention.

A first preferred embodiment of the improved holder of the present invention is schematically depicted in FIGS. 1-4, while FIG. 5 depicts a preferred embodiment of an animal call device storable in the holder of FIGS. 1-4 to form the improved assembly of the present invention.

Thus, holder 20 is shown which comprises a container 22 holding a rack 24 therein. Container 22 has a bottom portion 26 comprising a flat (horizontal) closed bottom 28, integrally connected to two opposite vertical closed sides 30 and 32 and to a closed rear wall 34 and closed front wall 36, all of which slope upwardly and rearwardly and define a lower storage space 38.

Container 22 also has an openable lid 40 hinged to rear wall 34 of bottom portion 26 by a strip 42 of flexible tape or the like. Thus lid 40 has a flat (horizontal) closed top 44 integrally connected to closed depending vertical sides 46 and 48, front wall 50 and rear wall 52, all defining an upper storage space 54 continuous with space 38 when lid 40 is closed.

It is to rear wall 52 that hinge strip 42 adheres. Sides 46 and 48 and walls 50 and 52 slope downwardly and forwardly so as to have the same slope as their counterparts in bottom portion 26, and rest on the upper edges of bottom portion 26 when lid 40 is closed to provide container 22 with a smooth unitary appearance. When closed, container 22 in side elevation is generally rhomboidal in configuration; that is, its top 44 and bottom 28 are parallel to each other and at an oblique angle to the front and rear of container 22, which front and rear are also parallel to each other. Container 22 is preferably generally square or rectangular in plan view. Top 44 is displaced rearwardly of bottom 28 so that the leading and trailing edges of container 22 are wedge-shaped, enabling container 22 to be easily slipped into and out of a pocket.

Rack 24 is disposed in space 38 and comprises a plurality (in this instance 5) of plates, namely plates 56, 58, 60, 62 and 64 extending across space 38 and dividing it into five parallel animal call device-receiving pockets 66, 68, 70, 72 and 74. All of these plates slope upwardly rearwardly at about the same angle of inclination as rear wall 34 and front wall 36. All of these plates rise above sides 30 and 32 and are rigidly connected to bottom 28 and/or sides 30 and 32, as by glue, stapling, etc. (not shown).

Plates 56, 58, 60 and 62 have the upper central portions 76 thereof notched out to provide means for readily gripping and removing animal call devices from the respective pockets 66, 68, 70 and 72.

One such typical animal call device is shown schematically in FIG. 5. Thus, device 78 is shown, which comprises a generally flat, semi-circular, resilient, flexible plate 80 of cloth, plastic or the like having an upper central opening 82 therein in which a thin, delicate flexible sheet reed 84 of rubber, plastic, paper, or the like is fixed. When a call is desired to be made, plate 80 is placed in the mouth with reed 84 forward, the lips are then pursed, and air is expelled around reed 84, causing it to vibrate to provide the desired call.

Naturally, plate 80 and reed 84 become wet in use and need to be dried out. When device 78 is placed in a pocket such as 66, 68, 70, 72 or 74 of rack 24, reed 84 will rise above the plates forming the pocket in which it is seated and when lid 40 is closed, reed 84 will extend into upper space 54 for easy rapid drying while device is safely and securely held in the rack pocket without rattling therein. A plurality of devices 78 can be carried in separate ones of rack pockets, that is, one per pocket, so that they don't stick together, but dry more rapidly, are not knocked against each other and damaged, and are easy to idenify and separately remove from container 22 as needed.

Container 22 can be made of metal, wood, rubber, plastic, stiffened cloth, paperboard, ceramic or other suitable self-supporting material. So also can rack 24 and its plates 56, 58, 60, 62 and 64. Strip 42 may be of cloth, rubber, plastic or the like. Thus, holder 20 can be made inexpensively but durably to hold animal call devices in a safe organized fashion for easy withdrawal therefrom.

Figure 6:
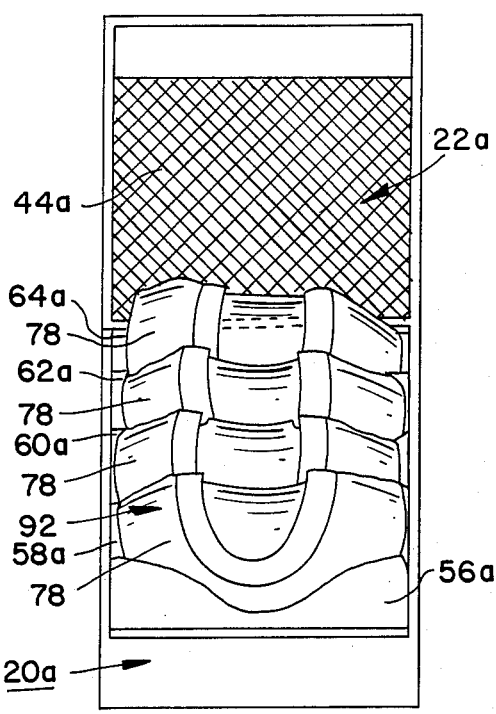
FIG. 6 is a schematic top plan view of a second preferred embodiment of the improved holder of the present invention, shown with a plurality of the animal call devices of FIG. 5 stored therein to form a preferred embodiment of the improved assembly of the present invention.
Figure 7:
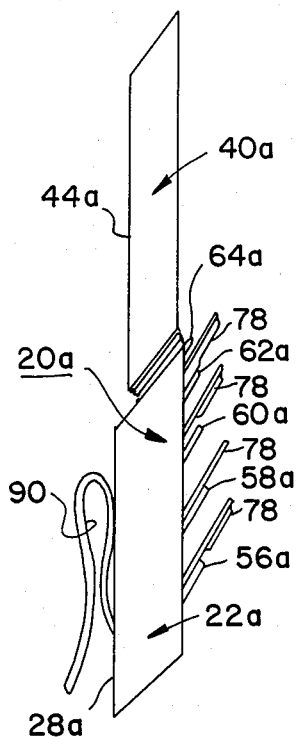
FIG. 7 is a schematic side elevation of the holder and assembly of FIG. 6.

FIGS. 6 and 7

A second preferred embodiment of the improved holder of the present invention is schematically depicted in FIGS. 6 and 7. Thus, holder 20a is shown. Components thereof similar to those of holder 20 bear the same numerals but are succeeded by the letter "a".

Holder 20a is identical to holder 20 except as follow:

a. holder 20a has a pocket clip 90 of metal, plastic or the like, affixed to the outer surface of bottom 28a to enable container 22a to be carried on the outer surface of a shirt pocket or jacket pocket for instant use; and, b. top 44a is fabricated of water vapor-permeable, rain-resistant cloth material so that devices 78 when placed in container 22a, as shown in FIGS. 6 and 7, have their reeds 84 dry more readily due to air circulation through container 22a.

FIGS. 6 and 7 also show a preferred embodiment of the assembly of the present invention, namely, holder 20a with devices 78 therein, comprising assembly 92. Holder 20a has the other advantages of holder 20, being sturdy, inexpensive, light in weight, easy to slip into and out of a pocket and providing safe, secure storage of devices 78.

FIG. 8

Figure 8:
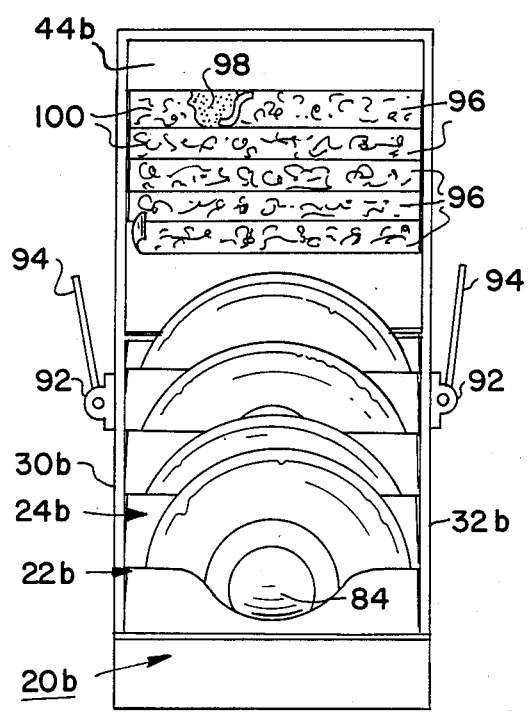
FIG. 8 is a schematic top plan view of a third preferred emobidment of the improved holder of the present invention with animal call devices therein to form another preferred embodiment of the present assembly; and, FIG. 9 is a schematic side elevation of a fourth preferred embodiment of the improved holder of the present invention.

A third preferred embodiment of the holder of the present invention is schematically depicted in FIG. 8. Thus, holder 20b is shown. Components thereof similar to those of holder 20 bear the same numerals but are succeeded by the letter "b".

Holder 20b is identical to holder 20, except as follows:

a. the outer surfaces of sides 30b and 32b bear loops 92 of metal, plastic, rubber, etc. through which a neck lanyard 94 is trained, so that holder 20b can be carried around the neck and thus be easily accessible; and, b. the inside of top 44b bears a plurality of parallel removable strips 96, in each instance held by a tacky adhesive layer 98 so as to be peelable from top 44b and replaceable, and upon the exposed surface of which can be placed indicia to identify the various call devices 78 disposed in the pockets of rack 24b.

It will be noted that devices 78 can be held in rack 24b in the reed-down position, if desired, when dry in order to additionally protect reeds 84 from accidental damage.

Holder 20b has the other advantages of holder 20.

FIG. 9

Figure 9:
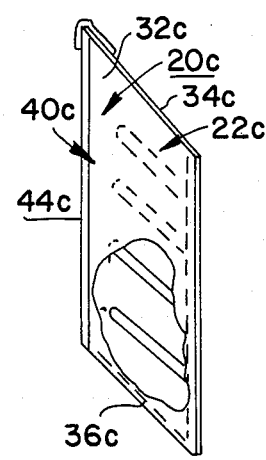

A fourth preferred embodiment of the holder of the present invention is schematically shown in FIG. 9. Thus, holder 20c is shown. Components thereof similar to those of holder 20 bear the same numerals but are succeeded by the letter "c".

Holder 20c is identical to holder 20 except as follows:

a. lid 40c has no depending sides, rear or front and no storage space, but is merely a flat top 44c; and, b. sides 30c and 32c are of a height about equal to the combined height of sides 30 and 46 (or 32 and 48) of holder 20; similarly, front 36c and rear 34c have a height about equal to the combined height of front 36 plus front 50 (or rear 34 plus rear 52), so that the overall height of holder 20c is about equal to that of holder 20.

Holer 20c has the other advantages of holder 20.

Various other modifications, changes, alterations and additions can be made in the improved holder and assembly of the present invention, their components and parameters. All such modifications, changes, alterations and additions as are within the scope of the appended claims form part of the present application.

Prior Art Statement

No search of prior art has been made. Applicant does not know of any animal call device holders which are similar to that of the present invention. Prior such holders are merely pouches and have not provided means such as the rack of the present holder for organizing the animal call devices systematically or for permitting their easy retrieval from the holder.

Prior art devices have not been shaped to permit their easy insertion into a pocket and their easy withdrawal therefrom, in contrast to the novel and improved configuration of the present holder. Moreover, the prior art devices have not permitted safe supporting of the animal call devices, easy identification thereof and rapid drying thereof, as provided by the present holder, which may include vapor-permeable, water droplet-resistant material. Accordingly, the improved holder of the present invention is believed to be clearly patentable thereover.

What is claimed is:

1. An improved animal call device holder, said holder comprising, in combination:
   a. a container having a rhomboidal configuration in side elevation with wedge-shaped lower and upper ends to facilitate insertion into and withdrawal from a pocket, said container having a bottom portion comprising a generally flat closed bottom and upraised, integral closed front, rear and sides sloped upwardly rearwardly to provide said wedge shape and defining a lower storage space therewith, and an openable lid for said container, hinged to said bottom portion and having a closed flat top and depending closed integral sides, front and rear defining an upper storage space sloped downwardly forwardly to match the slope of said bottom portion to provide said wedge shape and defining an upper storage space; and,
   b. a rack disposed in said container bottom portion and comprising a plurality of spaced parallel upwardly and rearwardly sloping plates connected to said bottom portion sides and/or bottom, and defining a plurality of pockets adapted to separately releasably hold the lower portions of generally flat animal call devices, said upper space being adapted to hold the upper portion of said animal calls.

2. The improved holder of claim 1 wherein said top and bottom are generally rectangular and wherein said lid is dimensioned to rest vertically on the rear edge of said top when opened.

3. The improved holder of claim 1 wherein the upper central portion of each said plate is notched out to allow an animal call to be readily lifted by fingers from said bottom portion and wherein the lower edges of said lid rest on the upper edges of said bottom portion when said container is closed.

4. The improved holder of claim 1 wherein said top comprises water vapor-permeable, water-resistant material which facilitates drying out of animal calls when held in said pockets and wherein the outer surface of said bottom portion bears at least one of a pocket clip and a pair of loops with attached neck lanyard.

5. The improved holder of claim 1 wherein the inside of said top comprises removable strips upon which indicia may be placed to identify animal calls when in said pockets, wherein the outer surface of said bottom bears a pocket clip and wherein said top is displaced rearwardly of said bottom when said lid is closed.

6. An improved animal call device holder assembly, said assembly comprising, in combination:
   a. a container having a rhomboidal configuration in side elevation with wedge shaped lower and upper ends to facilitate insertion into and withdrawl from a pocket, said container having a bottom portion comprising a closed flat bottom and integral closed upraised sides, front and rear defining a lower storage space, said front and rear being sloped rearwardly upwardly to provide said wedge shape, and an openable lid hinged to said bottom portion and having a closed flat top and integral closed depending sides, front and rear defining an upper storage space, said lid front and rear being sloped downwardly forwardly to match the slope of said bottom portion front and rear and provide said wedge shape;
   b. a rack disposed in said container bottom portion and comprising a plurality of spaced parallel upstanding plates sloped upwardly rearwardly, connected to said bottom portion sides and/or bottom and defining a plurality of pockets; and,
   c. a generally flat animal call device releasably disposed in one of said pockets and rising thereabove in said holder to facilitate easy removal thereof from said pocket.

7. The improved assembly of claim 6 wherein said top and bottom are generally rectangular, and wherein said top is displaced rearwardly of said bottom when said container is closed.

8. The improved assembly of claim 6 wherein said lid is dimensioned to rest vertically on the rear edge of said top when opened and wherein said bottom portion bears at least one of a pocket clip, and a pair of loops with attached neck lanyard.

9. The improved assembly of claim 6 wherein the central portion of each said plate is notched out to facilitate gripping and removal of said animal call from said pocket, and wherein the lower edges of said lid rest on the upper edges of said bottom portion.

10. The improved assembly of claim 6 wherein said top comprises water vapor-permeable, water-resistant material which facilitates drying out of said animal call in said pocket.

11. The improved assembly of claim 6 wherein the inside of said top bears strips upon which indicia can be placed to identify said animal call and wherein the outer surface of said bottom bears a pocket clip.

12. An improved animal call device holder, said holder comprising, in combination:
   a. a container having a rhomboidal configuration in side elevation with wedge-shaped lower and upper ends to facilitate insertion into and withdrawal from a pocket, said container having a bottom portion comprising a generally flat closed bottom and upraised, integral closed front, rear and sides sloped upwardly and rearwardly to provide said wedge shape, defining a central storage space, and an openable lid hinged to said bottom portion and having a closed flat top; and,
   b. a rack disposed in said container central space and comprising a plurality of spaced parallel upwardly and rearwardly sloping plates connected to said bottom and/or sides and defining a plurality of pockets adapted to separately releasably hold generally flat animal call devices.

13. The improved holder of claim 12 wherein the upper central portion of each said plate is notched out to facilitate gripping and removal of animal call devices from said pockets.

* * * * *